UNITED STATES PATENT OFFICE.

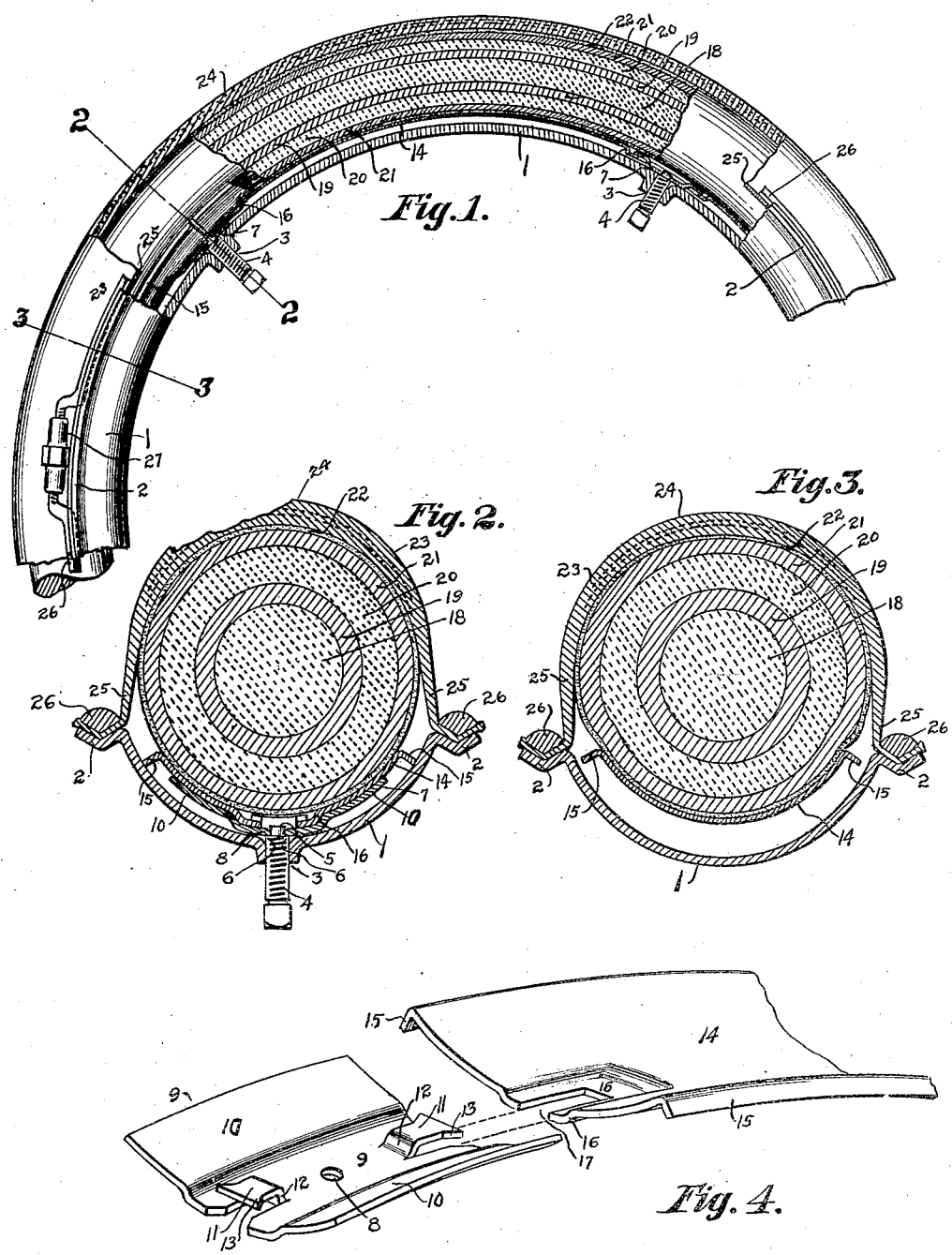

WILLIAM H. BACHTEL, OF CANTON, OHIO.

CUSHIONED WHEEL.

931,717. Specification of Letters Patent. Patented Aug. 24, 1909.

Application filed May 3, 1909. Serial No. 492,633.

*To all whom it may concern:*

Be it known that I, WILLIAM H. BACHTEL, a citizen of the United States, residing at Canton, in the county of Stark and State of Ohio, have invented certain Improvements in Cushioned Wheels; and I do hereby declare that the following is a full, clear, and exact description of the same, reference being had to the accompanying drawing, making a part of this specification, and to the numerals of reference marked thereon, in which—

Figure 1 is a side elevation, partly in section, of a portion of a cushioned wheel embodying my improvement, a portion of the cushion and wheel being broken away to more fully disclose the construction. Fig. 2 is a section on line 2—2 of Fig. 1. Fig. 3 is a section on line 3—3 of Fig. 1 showing the position of the parts when the cushion is slightly compressed. Fig. 4 is a perspective view of one of the coupling plates and a portion of one of the cushion carrying plates.

Throughout the several views similar numerals of reference indicate similar parts.

The present invention has relation to cushioned wheels adapted for use on various vehicles and particularly on automobiles and it consists in the novel arrangement hereinafter described and particularly pointed out in the claims.

In the drawings the numeral 1 indicates the felly or rim of the wheel. The rim is of the shape in cross-section illustrated in Figs. 2 and 3, and consists of a central convexo-concave portion and the lateral extending flanges 2 presenting peripheral broad V-shaped grooves for the purpose hereinafter described. In the drawings the spokes of the wheel have been entirely omitted for the reason that the said spokes form no particular part of the invention. In the rim 1, equidistant from the side edges thereof are a plurality of annularly spaced screw threaded apertures 3 in which are arranged set screws, 4, adapted to be adjusted within said screw threaded apertures so as to extend a greater or less distance through the rim 1. The point of each set screw is provided with a reduced portion 5 which, with the body of the screw, forms a shoulder 6.

Within the convex portion of the rim at each set screw is arranged one of the coupling plates 7, the portion 5 of the set screw extending through the aperture 8 in said plate, as clearly illustrated in Fig. 2. Each coupling plate 7 consists of a central portion 9 adapted to lie adjacent the concave surface of the rim 1, and the lateral off-set portions 10 formed integral with the portion 9 but so arranged as to be spaced from the surface of the rim 1, as best illustrated in Fig. 2. The contour of the plate 7 in cross-section is such that the surfaces of the off-set portions 10 will approximately correspond to the curved surface of the rim 1.

At both ends of each coupling plate the tongues 11 are cut from the central portion 9 and off-set outwardly substantially twice the thickness of the material of which the plate 7 is made. Each tongue consists of a stem portion 12 and a head portion 13 wider than said stem portion for the purpose hereinafter described. Extending from coupling plate to coupling plate in annular series about the rim 1 are the cushion carrying plates 14. Each of said plates is convexo-concave in cross-section, the curvature being substantially the same as the curvature of the portions 10 of the coupling plates 7. The plates 14 are of appropriate length to extend over the plates 7 so that the ends of adjacent cushion carrying plates will abut when the plates 7 rest upon the surface of the rim 1 and the plates 14 rest upon the plates 7. The plates 14 are provided with the lateral strengthening flanges 15 adapted to increase the rigidity of the said plates which are formed of material substantially of the same thickness as that used in the construction of the plates 7. At each end of each plate 14 is arranged a depression 16 adapted to correspond to the relatively depressed central portion 9 of the coupling plates. Longitudinally disposed slots 17 are arranged in the said depressed portions of the plates 14, the said slots being of slightly greater width than the stem portions 12 of the tongues 11 and being of sufficient length to permit the plates 14 to overlie the plates 7 and permit the edges of adjacent cushion carrying plates to abut, as before mentioned. The rim, set screws, coupling plates and cushion carrying plates being in position, it will readily be understood that by adjusting the set screws to extend farther through the rim 1 the coupling plates 7 will be lifted from the surface of the rim, carrying with them the cushion carrying plates 14. As the cushion carrying plates are thus moved outwardly it is evident that the circumference of the series of cushion carrying plates will be increased. The abutting edges of the plates 14 will therefore be moved apart from each other, the plates 14 sliding along the plates 7 and the tongues 11, with the head portions 13 engaging the outer surface of the depressed portion 16 along the edges of the slot 17 maintaining the plates 14 in proper relation with reference to the plates 7. In this manner it will be understood that the circumference of the series of plates 14 may be readily adjusted as desired.

The cushion consists of a central core 18 formed of sponge rubber or other suitable elastic material provided with an external cover 19 of Para rubber, which in turn is inclosed in a layer or coating 20 of sponge rubber provided on its external surface with a second cover or coating 21 of Para rubber, which in turn is inclosed in a felt casing 22. It will thus be understood that the cushion consists of concentric layers of sponge and Para rubber inclosed in the felt casing as described.

The cushion should be of appropriate size so that when the cushion carrying plates 14 are adjusted closest to the rim 1, or at their least circumference the said cushion may be snugly fitted thereon, the elasticity of its materials of construction being such as to permit of the ready application of said cushion when the said plates are in their said adjustment of least circumference.

It should be understood that it is not at all the purpose to permit the cushion to come into contact with the ground. For the purpose of protecting said cushion and to provide a renewable portion which may from time to time be replaced when worn out, I provide the wear strip 23, which should be constructed of flexible, tough and wear-resisting material. If desired the wear strip may be comparatively heavier at its tread portion 24, as shown in the drawings, and reduced in thickness at its lateral edges 25 which are intended to be clamped to the lateral flanges 2. For the purpose of properly clamping the edges 25 to said flanges the clamping hoops 26 are provided. One of said hoops is arranged upon each of the flanges 2, the side of said hoop adjacent the said flange corresponding to the broad V-shape of the outer surface of said flanges hereinbefore referred to. The edges 25 are arranged upon the flanges 2 and the hoops 26 clamped down firmly upon the said edges by means of clamping knuckles 27 by which the said hoops may be contracted.

When the edges 25 have been securely attached and clamped to the flanges 2 the set screws 4 may be turned up so as to lift the plates 7 from the rim 1. In lifting the plates 7, the plates 14 will be lifted, thus increasing the circumference of the series of plates 14, and the said plates 14, carrying the cushions will press the said cushions outwardly in a firm manner against the inner side of the wear strip 23. In this manner the resiliency and elasticity of the cushioned wheel may be increased or diminished at pleasure, the hardness of the cushioned wear strip being increased as the cushion is pressed outwardly and decreased when the set screws 4 are loosened.

I claim:

1. A cushioned wheel comprising a concave rim provided with lateral flanges presenting peripheral V-shaped grooves, said rim provided with screw threaded apertures, set screws arranged in said screw threaded apertures, coupling plates arranged upon said set screws, an annular series of cushion carrying plates arranged upon said coupling plates, an elastic cushion located on said cushion carrying plates, and a wear strip adapted to externally cover said cushion and having its edges connected to the lateral flanges of the rim, the set screws being adapted to be adjusted within said screw threaded apertures.

2. A device of the character described comprising a wheel provided with a rim, coupling plates arranged in a spaced annular series about said rim, cushion carrying plates adjustably connected to said coupling plates and arranged in an annular series about said rim, a cushion arranged upon said cushion carrying plates, a wear strip extending over said cushion and having its edges detachably connected to said rim, and means for adjusting said coupling plates with reference to said rim.

3. In a cushioned wheel of the character described the combination of a rim, coupling plates arranged in a spaced annular series about said rim, each coupling plate comprising a central portion and lateral off-set portions spaced from the surface of said rim and an outwardly off-set tongue arranged at each end of each coupling plate, cushion carrying plates extending in an annular series from coupling plate to coupling plate, each of said cushion carrying plates provided with lateral strengthening flanges and with a depression at each end provided with a slot adapted to engage the tongue on the corresponding end of the adjacent coupling plate, the cushion carrying plates being longitudinally adjustable upon said coupling plates, and means for adjusting said coupling plates with reference to said rim, whereby the circumference of the annular series of cushion carrying plates may be increased or diminished.

4. In a cushioned wheel of the character described, a rim, coupling plates arranged in a spaced annular series about said rim, cushion carrying plates extending in an annular series from coupling plate to coupling plate, each coupling plate supporting the abutting ends of two adjacent cushion carrying plates of the series, means for holding said coupling plates in engagement with said cushion carrying plates while permitting longitudinal adjustment of said cushion carrying plates with reference to said coupling plates and with reference to each other, and means for adjusting said coupling plates with reference to said rim and for holding said coupling plates in fixed adjustment.

5. In a cushioned wheel the combination of a rim provided with lateral flanges having peripherally disposed V-shaped grooves, an annular series of spaced coupling plates arranged on said rim, an annular series of cushion carrying plates arranged upon said coupling plates, each cushion carrying plate extending from one coupling plate to the next coupling plate of the series, means for adjustably connecting said coupling plates to said cushion carrying plates, a cushion composed of concentric layers of sponge and Para rubber inclosed in a felt casing arranged upon said cushion carrying plates, a wear strip of flexible, wear-resisting material arranged upon said cushion, the edges of said wear strip arranged in said peripherally disposed V-shaped grooves, clamping hoops provided with V-shaped clamping faces corresponding to the V-shaped clamping grooves and adapted for circumferentially contractile adjustment, said hoops arranged upon the lateral flanges of the rim and adapted to clamp the edges of said wear strip in the V-shaped grooves, and set screws extending through said rim and adjustable therein, each of said set screws adapted to engage one of said coupling plates.

In testimony that I claim the above, I have hereunto subscribed my name in the presence of two witnesses.

WILLIAM H. BACHTEL.

Witnesses:
LAURA R. KLINE,
WILLIAM H. MILLER.